Patented Jan. 29, 1924.

1,482,340

UNITED STATES PATENT OFFICE.

GEORGE WILSON ACHESON, OF NEWARK, NEW JERSEY, ASSIGNOR TO ACHESON CORPORATION, OF NEW YORK, N. Y., A CORPORATION OF DELAWARE.

RUBBER COMPOSITION AND PROCESS OF MAKING SAME.

No Drawing.      Application filed July 15, 1920. Serial No. 396,462.

*To all whom it may concern:*

Be it known that I, GEORGE WILSON ACHESON, a citizen of the United States, residing at Newark, in the county of Essex and State of New Jersey, have invented certain new and useful Improvements in Rubber Compositions and Processes of Making Same, of which the following is a specification.

This invention relates to the preparation of a novel rubber composition containing a carbonaceous or other filling material in an initially-deflocculated state, and to the novel product of the operation.

It is now well understood that certain solid materials such as graphite, lampblack, clay, amorphous pigments and the like, when rubbed, ground or otherwise subjected to a process of attrition in presence of so-called "deflocculating agents," are ultimately reduced to a state of extreme subdivision, as a result of which a greater or less proportion of the particles become permanently suspensible in water and capable of diffusing therethrough; and may by appropriate treatment be transferred to and suspended in vehicles other than water, for example mineral oils, etc.

The deflocculating agents above referred to comprise tannin and tannin-like bodies, and other organic bodies or products capable of producing similar effects. Certain methods of deflocculating solid bodies and utilizing the resulting deflocculated products are disclosed in the prior United States Patents to E. G. Acheson Nos. 722,791; 843,426; 844,989; 875,881; 895,063; 911,358; 931,832; 964,478; 966,636; 986,793; 1,030,372; 1,082,386; 1,201,994; 1,223,350.

The word "deflocculated" is used herein to designate the state assumed by such inorganic solids as graphite, lampblack, clay, amorphous pigments and the like when subjected in paste form to a process of attrition in presence of an organic "deflocculating agent" which is either a tannin-like body, or another organic substance (extract from roasted cereal etc.) which has essentially the same properties as tannin in this particular relation.

According to the present invention I utilize the properties of matter in the deflocculated or colloidal state in such manner as to secure a remarkably uniform and intimate distribution of solid substances, especially lampblack, clay, etc. through rubber or rubber-bearing compositions.

I prefer to proceed as follows, it being understood that my invention is not limited to the particular manipulations below described, nor to the use of the particular amorphous solids (lampblack and clay) which I now prefer to incorporate with the rubber.

Pará or other suitable grade of raw rubber or rubber-like gum is first dissolved in any appropriate solvent, as for example benzene or other hydrocarbon, forming a practically saturated solution therein. If desired small proportions of alcohol may be added to accelerate the solution.

Lampblack, clay or other appropriate material, suitable for use as a filler, is deflocculated in accordance with the known methods, the immediate product of this operation being a water-bearing paste, the solid component of which exists partially or wholly in the deflocculated state,—that is, is permanently suspensible upon dilution of the paste by pure water, and exists in the so-called colloidal state, being re-precipitated by the addition of small proportions of electrolytes.

It is not necessary for the purposes of this invention that the solid material should be wholly deflocculated, although in the case of such readily deflocculatable materials as lampblack and clay it is practicable to secure substantially complete deflocculation in a single operation, and this is the preferred method of procedure.

The paste prepared as above is stirred into the rubber-bearing solution and thoroughly incorporated therewith by any suitable mechanical mixing device. At this point either one of the two following procedures may be adopted:

(1) The mixture is thoroughly kneaded until the rubber solution becomes absorbed by or compounded with the solid component (lampblack, clay etc.), the water component of the paste being thereby displaced, and being drawn off and rejected.

(2) Or, alternatively, a few drops of an aqueous solution of hydrochloric acid or other flocculating agent (electrolyte) are added to the mixture. Thereupon the colloidal materials (rubber and colloidal lampblack or clay) are simultaneously precipitated in the form of a highly plastic and intimately mixed mass. The water may be poured off.

By proceeding in accordance with either of the above methods, I obtain a highly intimate mixture of the finely divided lampblack, clay or equivalent filler, and the rubber, associated with a greater or less proportion of the benzene or other rubber solvent, which is usually of a volatile character. This mass may now be directly incorporated with additional quantities of rubber, an operation which is performed on the rubber rolls in the usual manner but will be found to proceed rapidly and thoroughly by reason of the previous intimate incorporation of the filler with rubber.

My invention is of course not limited to the use of any particular proportions as between rubber and filler, since these proportions may be widely varied according to the use to which the final rubber composition is to be applied. As a rule, I prefer to incorporate as much filler as practicable with the original rubber solution, since thereby the consumption of volatile solvent is minimized. This solvent is volatilized before or during the final rubber mixing operation, and may of course be recovered in any of the usual recovery systems.

I claim:—

1. Process of making a rubber composition, comprising subjecting an inorganic solid in paste form to attrition in presence of an organic deflocculating agent, and incorporating the product with rubber.

2. A novel composition of matter comprising rubber and a filler therefor, said filler containing an initially-deflocculated inorganic body and an organic deflocculating agent.

3. Product according to claim 2 in which the initially-deflocculated filler is clay.

In testimony whereof, I affix my signature.

GEORGE WILSON ACHESON.